United States Patent [19]
Kitajima

[11] Patent Number: 4,922,281
[45] Date of Patent: May 1, 1990

[54] DISTANCE MEASURING DEVICE FOR AUTOMATIC FOCUSING CAMERA

[75] Inventor: Tomoya Kitajima, Kawasaki, Japan
[73] Assignee: Ricoh Company, Ltd., Tokyo, Japan
[21] Appl. No.: 347,031
[22] Filed: May 4, 1989
[30] Foreign Application Priority Data May 7, 1988 [JP] Japan ............................... 63-109874
Jul. 5, 1988 [JP] Japan ............................ 63-88440[U]
Mar. 10, 1989 [JP] Japan ................................... 1-58795

[51] Int. Cl.$^5$ .............................................. G03B 3/00
[52] U.S. Cl. ................... 354/404; 354/408; 354/195.1
[58] Field of Search ............... 354/402, 403, 404, 405, 354/408, 195.1

[56] References Cited
U.S. PATENT DOCUMENTS

| | | | |
|---|---|---|---|
| 3,610,127 | 10/1971 | Runle | 354/404 |
| 4,125,847 | 11/1978 | Abe | 354/404 |
| 4,146,316 | 3/1979 | Osawa | 354/405 |
| 4,183,640 | 1/1980 | Abe | 354/404 |
| 4,191,882 | 3/1980 | Sato | 354/405 |
| 4,247,762 | 1/1981 | Wilwerding | 354/405 |
| 4,253,751 | 3/1981 | Tokutomi et al. | 354/405 |
| 4,346,975 | 8/1982 | Isono | 354/405 |
| 4,694,149 | 9/1987 | Toyama et al. | 354/404 |
| 4,740,806 | 4/1988 | Takehana | 354/403 |

Primary Examiner—Russell E. Adams
Attorney, Agent, or Firm—Oblon, Spivak, McClelland, Maier & Neustadt

[57] ABSTRACT

A distance measuring device of a triangulation system type for an automatic focusing camera having a photographing optical system. The device comprises a distance measuring unit for measuring a distance to an object to be focused through the photographing optical system. The unit is comprised of a pair of image detecting elements each for detecting an image of the object, and a pair of distance-measuring optical systems each for imaging the object onto one of the image detecting elements. A drive mechanism is provided for pivotally moving the distance-measuring optical systems and the image detecting elements of the unit integrally in a plane parallel to each of optical axes of distance-measuring optical systems, without causing any relative movement of the distance-measuring optical systems and the image detecting elements with respect to each other. A control mechanism is provided for controlling the drive mechanism so as to stop pivotal movement of the unit at each of at least two or more different pivotal angular positions thereof to thereby enable measurement of distance to each of at least two or more different points appearing in the field of view of the camera.

10 Claims, 5 Drawing Sheets

WIDE ANGLE MODE

Fig. 6B

TELEPHOTO MODE

WIDE ANGLE MODE

Fig. 9B

TELEPHOTO MODE

DISTANCE MEASURING DEVICE FOR AUTOMATIC FOCUSING CAMERA

BACKGROUND OF THE INVENTION

The present invention relates to a distance measuring device for an automatic focusing camera. More particularly, the invention relates to a distance measuring device of a triangulation system type for measuring a distance to each of at least two or more different points of an object which appears in a predetermined field of view of the camera.

Recently, automatic focusing (AF) cameras, which are able to measure a distance to an object and then to effect focusing of the object by automatically moving a photographing lens on the basis of the result of distance measurement, have been widely developed and used.

Generally, conventional AF cameras are so constructed as to measure a distance to an object which appears in the center of a field of view of a finder of the AF camera, and then to automatically move a photographing lens on the basis of the result of distance measurement. Accordingly, an undesirable mis-focusing phenomenon, such as a so-called center passing phenomenon, tends to occur in the conventional AF cameras. A typical example of such an undesirable phenomenon will be explained below in more detail.

When the AF camera is used in a state that an object, such as a person, which is to be focused, appears out of a central area mark provided in the finder, while background existing substantially in infinity appears in the central area mark, the background will be brought into focus, with the object being out of focus, because the photographing lens is adjusted in accordance with the result of measurement of a distance to the background.

Various AF mechanisms for preventing the above-described undesirable phenomenon have been proposed.

For example, Japanese Patent Application Laying-Open No. 59-193307 (referred to as a first reference hereinafter) discloses an AF mechanism for a camera, which comprises a distance measuring device for measuring a distance to each of a plurality of different points, one appearing in the central area of a field of view of a finder of the camera and others appearing out of the central area of the field of view. In this AF mechanism, a movable part of the photographing lens is adjusted in position in accordance with the shortest distance selected from the plurality of distances each obtained by the measurement.

Japanese Patent Application Laying-Open No. 62-223734 (referred to as a second reference hereinafter) also discloses a distance measuring device for an AF camera, which can measure a distance to each of a plurality of different points within a field of view of a finder of the camera. The distance measuring device comprises a light emitting element consisting of an array of three light emitting diodes, and a large-sized position sensitive device as a distance measuring element. In order to prevent the above-described center-passing phenomenon, the device is adapted to measure a distance to each of three different points by using different three optical axes for measurement which are slanted with respect to each other and one of which extends substantially in parallel to an optical axis of a photographing lens.

Further, Japanese Patent Application Laying-Open No. 57-197414 (referred to as a third reference hereinafter) also discloses a distance measuring device for an AF camera, which comprises a pair of optical systems for imaging an object, which are spaced from one another with an interval corresponding to a predetermined reference length. The distance measuring device further comprises a pair of photosensor-arrays, such as charge-coupled device (CCD), which are placed on respective positions on which images of an object are formed, respectively. In the distance measuring device of the third reference, a spatial phase-discrepancy between the two images formed on the respective photosensor-arrays is detected, and a distance to the object is calculated on the basis of the result of detection of the phase discrepancy. Further, in the AF mechanism of the third reference, a component, such as a mirror, of at least one of the two optical systems is movable mechanically in stages so that a point of intersection of the optical axes of the optical systems can be shifted toward a position closer to the camera. Accordingly, a minimum measurable distance can be decreased.

In the distance measuring device disclosed in the first reference, a light emission system consisting of a light emitting element and an optical components for light emission is so controlled as to emit a light beam forwardly from the camera and scan it over a predetermined angular range from a position close to the camera to infinity, while a light receiving system consisting of a light receiving lens and a photoelectric conversion element is maintained stationarily. Accordingly, the device disclosed in the first reference has a disadvantage in that tight tolerances of the components of the device are required in machining and assembling processes thereof. Plays are tends to be generated in the light emission system and the light receiving system due to wear during the repetition of the operation of the distance measuring device, resulting in reduced accuracy of distance measurement.

Further, the distance measuring device disclosed in the second reference is advantageous with respect to a stability of accurate measurement and durability of the device, because a light emission system, which is comprised of a plurality of light emitting elements and a lens, and a light receiving system comprised of a plurality of unidimensional position-detecting elements, each of which is made of a semiconductor, and a light receiving lens, are maintained stationarily. However, the device disclosed in the second reference has a disadvantage in that the light emission system and the light receiving system are complicated in construction, and large occupational spaces for accommodating these systems are required, resulting in increased manufacturing cost.

Furthermore, the distance measuring devices disclosed in the first and second references can effect distance measurement in a multi-point measuring mode such as a three-point measuring mode, as mentioned above. However, in these devices, movement of the measuring center axis is restricted within a predetermined fixed range. Accordingly, when a lens of a variable focal point type is used as the photographing optical lens, the angle of view of the lens will be varried in accordance with changes in the focal point thereof, and thus a measuring point will be shifted on the surface of a photosensitive film. Therefore, these devices can not obtain a satisfactory result of distance measurement in the multi-point measuring mode.

On the other hand, in the distance measuring device disclosed in the third reference, the movable component of the imaging optical system has to be manufactured and assembled in a high accuracy, resulting in increased manufacturing cost. Plays are apt to be generated in the movable component due to wear thereof during the repetition of the operation of the distance measuring device, resulting in reduced accuracy of distance measurement.

SUMMARY OF THE INVENTION

It is therefore an object of the present invention to provide a distance measuring device for an automatic focusing camera, which can be simply constructed with reduced manufacturing cost and is capable of measuring a distance to each of a plurality of points with high accuracy while preventing any undesirable phenomenon such as a center-passing phenomenon.

It is another object of the present invention to provide a distance measuring device for an automatic focusing camera, which can be simply constructed with reduced manufacturing cost and is capable of measuring a distance to each of a plurality of points while preventing any undesirable phenomenon such as a center-passing phenomenon even when a lens of a variable focus type is used as the photographing optical system.

It is further object of the present invention to provide a distance measuring device for an automatic focusing camera, which can be simply constructed with reduced manufacturing cost and can decrease a minimum measurable distance without reduction of accuracy of distance measurement even when the device is used repeatedly.

The object of the invention can be achieved by a distance-measuring device of a triangulation system type for an automatic focusing camera having a photographing optical system, comprising: a distance measuring unit for measuring a distance to an object to be focused through the photographing optical system, the unit being comprised of a pair of image detecting elements each for detecting an image of the object, and a pair of distance-measuring optical systems each for imaging the object onto one of the image detecting elements; a drive mechanism for pivotally moving the distance-measuring optical systems and the image detecting elements of the unit integrally in a plane parallel to an optical axis of the distance-measuring optical system without causing any relative movement of the distance-measuring optical systems and the image detecting elements with respect to each other; and a control mechanism for controlling the drive mechanism so as to stop pivotal movement of the unit at each of at least two or more different pivotal angular positions thereof to thereby enable measurement of distance to each of at least two or more different points appearing in a field of view of the camera.

In the above-mentioned device, the distance-measuring optical systems and the image detecting elements of the unit are pivotally moved integrally in the plane parallel to the optical axis of the distance-measuring optical system, and pivotal movement of the unit can be stopped at each of at least two or more different pivotal angular positions so as to enable measurement of distance to each of at least two or more different points appearing in the field of view of the camera. Accordingly, even when an object to be focused appears out of the central portion of the field of view of the camera, it is possible to measure a distance to the object while preventing any mis-focusing phenomenon such as a center passing phenomenon.

Further, since the distance-measuring optical systems and the image detecting elements of the unit are pivotally moved integrally without causing any relative movement of the distance-measuring optical systems and the image detecting elements with respect to each other, it is possible to simply construct the device, with easy adjustment of the optical axes of the distance-measuring optical systems and reduced manufacturing cost, while preventing reduction of accuracy of distance measurement even when the device is used repeatedly.

The another object of the invention can be achieved by a distance measuring device as mentioned above, wherein the control mechanism is adapted to adjust a maximum angular range of pivotal movement of the distance measuring unit in accordance with changes in a focal distance of the photographing optical system.

In the above-mentioned device, since the maximum angular range of pivotal movement of the distance measuring unit can be adjusted in accordance with changes in the focal distance of the photographing optical system, it is possible to apply the device advantageously to an automatic focusing camera having a photographing optical system having a variable focal distance, such as a zooming lens, without any mis-focusing phenomenon such as a center-passing phenomenon.

Further object of the invention can be achieved by a distance measuring device of a triangulation system type for an automatic focusing camera having a photographing optical system which is selectively operatable in a normal-distance photographing mode for photographing an object located at a position relatively far from the camera and in a short-distance photographing mode, such as a macro mode, for photographing an object located at a position close to the camera, comprising: a pair of image detecting elements each of which detects an image of an object to be focused through the photographing optical system to output image data; a pair of distance-measuring optical systems each for imaging the object onto one of the image detecting elements, the distance-measuring optical systems being spaced a predetermined reference length from each other; an actuating mechanism for pivotally moving the distance-measuring optical systems and the image detecting elements integrally in a plane parallel to each of optical axes of distance-measuring optical systems in accordance with changes in the mode of operation of the photographing optical system, so that the angular position of each of the optical axes of distance-measuring optical systems during the short-distance photographing mode and the angular position of the same during the normal-distance photographing mode are different from each other; and a processing mechanism for calculating a distance to an object to be focused through the photographing optical system, which is in the state of the short-distance photographing mode, by comparing two image data, one of which is obtained from one of the image detecting elements when the photographing optical system is in the normal-distance photographing mode, while the other being obtained from the other image detecting element when the photographing optical system is in the short-distance photographing mode.

In the above-mentioned device, since the distance-measuring optical systems and the image detecting elements can be pivotally moved integrally, it is possible to simply construct the device with easy adjustment of the optical axes of the distance-measuring optical systems and reduced manufacturing cost, and to prevent reduction of accuracy of distance measurement even when the device is used repeatedly.

Further, in the above-mentioned device, when the normal-distance photographing mode is selected, a distance to an object located at a position not close to the camera can be calculated by comparing the two image data, one of which is obtained from one of the image detecting elements when the photographing optical system is in the normal-distance photographing mode, while the other being obtained from the other image detecting element when the photographing optical system is also in the normal-distance photographing mode.

On the other hand, in the above-mentioned device, when the short-distance photographing mode is selected, a distance to an object is calculated by comparing the two image data, one of which is obtained from one of the image detecting elements when the photographing optical system is in the normal-distance photographing mode, while the other being obtained from the other image detecting element when the photographing optical system is in the short-distance photographing mode. In this case, since the angular position of each of the optical axes of distance measuring optical systems during the short-distance photographing mode and the angular position of the same during the normal-distance photographing mode are different from each other, it is possible to calculate accurately a distance to an object located at a position close to the camera, by comparing the two image data, one of which is obtained from one of the image detecting elements when the photographing optical system is in the normal-distance photographing mode, while the other being obtained from the other image detecting element when the photographing optical system is in the short-distance photographing mode.

Further objects, features and advantages of the present invention will become apparent from the following description on the preferred embodiment of the present invention as illustrated in the accompanying drawings.

BRIEF DESCRIPTION OF THE DRAWINGS

FIGS. 6A and 6B are schematic plan views which illustrate changes in an angular position of a measuring center axis of the distance measuring device of the third embodiment, in which FIG. 6A shows a case where the photographing lens is in a wide angle mode and FIG. 6B shows a case where the photographing lens is in a telephoto mode;

FIGS. 9A and 9B are schematic plan views which illustrate changes in an angular position of a measuring center axis of the distance measuring device of the fourth embodiment, in which FIG. 9A shows a case where the zoom lens is in a wide angle mode, and FIG. 9B shows a case where the zoom lens is in a telephoto mode;

DESCRIPTION OF THE PREFERRED EMBODIMENTS

Preferred embodiments of the present invention will now be described in detail with reference to the accompanying drawings. It is to be noted that like constituent elements are designated by like reference numerals throughout the accompanying drawings except for FIGS. 10 to 12.

Figure 1:
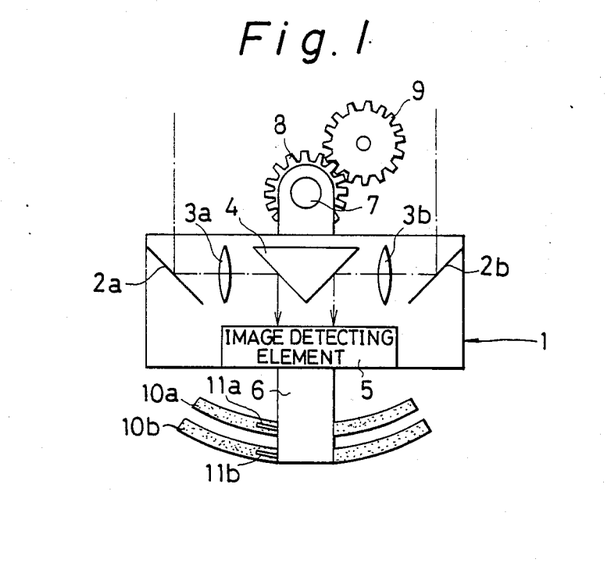
FIG. 1 is a schematic plan view of a distance measuring device according to a first embodiment of the present invention.
Figure 2:
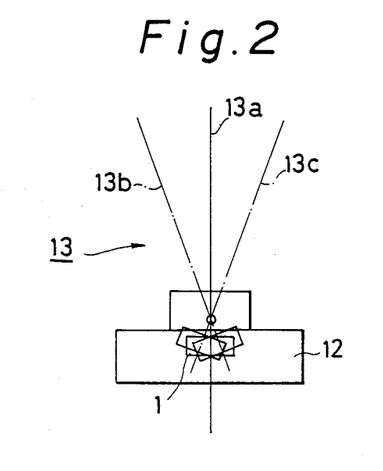
FIG. 2 is a schematic plan view of a camera for explaining changes in an angular position of a measuring center axis of the distance measuring device shown in FIG. 1.
Figure 3:
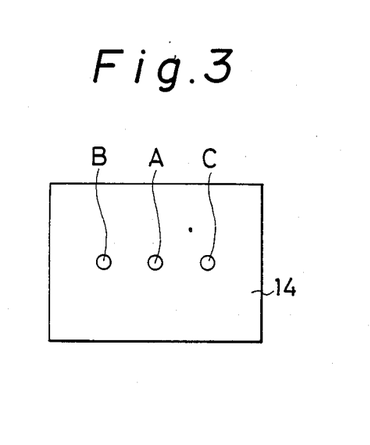
FIG. 3 is a front view schematically illustrating a finder of the camera according to the first embodiment.

FIGS. 1 to 3 are views for explaining a first embodiment of the invention.

FIG. 1 is a schematic plan view of a distance measuring device of the first embodiment for an automatic focusing (AF) camera, in which reference numeral 1 designates a distance measuring unit which utilizes the principle of a triangulation measurement method and to which a passive autofocusing system is applied. The distance measuring unit comprises two mirrors 2a and 2b, two lenses 3a and 3b, a triangular prism 4 having a pair of opposite inclined reflecting surfaces, and an image detecting element 5. The mirror 2a, the lens 3a, and one of the reflecting surfaces of the prism 4 together constitute a first distance measuring optical system of the unit 1, and the mirror 2b, the lens 3a, and the other reflecting surface of the prism 4 together constitute a second distance-measuring optical system of the unit 1. These distance measuring optical systems have different optical axes for measuring, respectively.

The distance measuring unit 1 is supported at a center portion thereof on an elongated supporting plate 6 which extends in parallel to a measuring center axis of the unit 1 and has a front end portion projecting forward from the unit 1. Secured to the front end portion of the supporting plate 6 is a rotary shaft 7 which is provided with a gear 8 fixed thereto. The supporting plate 6 is pivotally movable about the center axis of the shaft 7. Intermeshing with the gear 8 is a gear 9 which transmits a drive force for pivotally moving the measuring center axis of the unit 1 from a drive means such as an electric motor (not shown) to the gear 8.

Disposed behind the distance measuring unit 1 are a pair of spaced resistance films 10a and 10b for detecting a rotational angular position of the measuring center axis of the distance measuring unit. Each of the resistance films has an arc-shaped pattern having a center-point at the center axis of the rotary shaft 7. The supporting plate 6 also has a rear end portion projecting rearwardly from the unit 1. Attached to the rear end portion of the supporting plate are a pair of spaced brushes 11a and 11b each of which is brought into resilient contact with one of the resistance films 10a and 10b. The rotational angular position of the measuring center axis of the distance measuring unit can be detected on the basis of the value of resistance of the resistance films 10a and 10b detected between the brushes 11a, 11b and one ends of the resistance films 10a and 10b.

The supporting plate 6, rotary shaft 7, gears 8 and 9 together constitute a driving function portion, referred to as a unit-rotating means, for driving the distance measuring unit 1 so as to pivotally move the measuring center axis about the center axis of the rotary shaft 7 in a plane which is substantially parallel to a photographing optical axis. On the other hand, the resistance films 10a and 10b and the brushes 11a and 11b together constitute a control function portion, referred to as a rotational angle control means, for controlling the rotational angular position of the measuring center axis such that distance measurement can be effected with the measuring center axis located at a predetermined rotational angular position.

FIG. 2 is a schematic view for explaining changes in an angular position of the measuring center axis of the distance measuring device shown in FIG. 1, in which reference numeral 12 designates the AF camera which contains therein the distance measuring device and is provided with a photographing lens (not shown) having a photographing optical axis oriented toward the front of the AF camera 12. In FIG. 2, a reference numeral 13 generally designates the measuring center axis, and reference numerals 13a, 13b, and 13c designate different angular positions of the measuring center axis 13, respectively. Only the unit 1 of the distance measuring device is schematically shown in FIG. 2 for clarity.

FIG. 3 shows a finder 14 of the AF camera 12, which defines therein a rectangular field of view. When the distance measuring device is intended to measure a point A appearing in the center of the field of view of the finder 14, the measuring center axis 13 is then moved to the angular position 13a. Accordingly, when located at the position 13a, the measuring center axis 13 is made substantially parallel to the optical axis of the photographing lens of the AF camera. When the distance measuring device is intended to measure a point B appearing in the left side part of the field of view of the finder 14, the measuring center axis 13 is then moved to the angular position 13b. Further, when the distance measuring device is intended to measure a point C appearing in the right side part of the field of view of the finder 14, the measuring center axis 13 is then moved to the angular position 13c.

Figure 13:
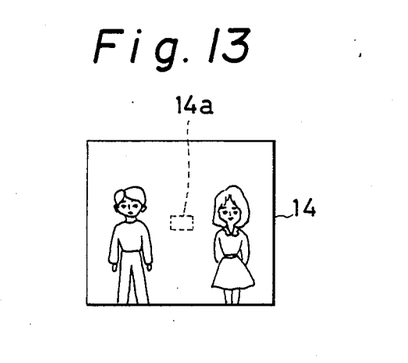
FIG. 13 is a schematic view of a finder for explaining a center-passing phenomenon which tends to occur in a conventional AF camera.

FIG. 13 shows a similar finder 14 of a conventional AF camera. The conventional AF camera is so constructed as to measure a distance to an object, which appears in a central area mark 14a of a finder 14, and then to automatically move a photographing lens on the basis of the result of distance measurement. When the conventional AF camera is used in a state that, for example, two persons appear out of a central area mark 14a, while background existing substantially in infinity appears in the central area mark, the background will be brought into focus, with the persons being out of focus, because the photographing lens is adjusted in accordance with the result of measurement of the distance to the background. Accordingly, an undesirable misfocusing phenomenon, such as a center-passing phenomenon, tends to occur in the conventional AF camera.

Further, in the AF camera 12 including the above-mentioned distance measuring device of the first embodiment, when it is judged, in a controlling system (not shown) which is provided in the camera, that the distance measurement device has to effect distance measurement for three-points, the rotational angle control means is activated to drive the electric motor, which causes the supporting plate 6 to move pivotally until the measuring center axis 13 arrives at the angular position 13a. Namely, the measuring center axis 13 is directed to the front of the AF camera 12. As the supporting plate 6 and the brushes 11a and 11b together are pivotally moved, the value of resistance of the resistance films 10a and 10b detected between one ends thereof and the brushes 11a and 11b is changed. Based on the value of resistance detected, it is judged whether or not the measuring center axis 13 is located at the position 13a. A first distance measurement is effected when the measuring center axis 13 is in the position 13a, and then a first distance data obtained by the first distance measurement is stored in a memory (not shown). Next, the measuring center axis 13 is moved to the position 13b at which the measuring center axis is directed to the left side of the front of the AF camera 12. In this state, a second distance measurement is effected, and then a second distance data obtained by the second distance measurement is also stored in the memory. Then, the measuring center axis 13 is moved to the position 13c at which the measuring center axis is directed to the right side of the front of the AF camera 12. In this state, a third distance measurement is effected, and then a third distance data obtained by the third distance measurement is also stored in the memory. Then, resultant data for determining the position of the photographing lens for obtaining an optimum object distance to be focused is calculated from the first through third distance data in accordance with a predetermined calculation formula, and then the photographing lens of the AF camera 12 is moved automatically in accordance with the resultant data.

Although, in the first embodiment, the passive autofocusing system is applied to the distance measuring unit 1 to perform the triangulation measurement method, it should be understood that an active autofocusing system may be applied to the distance measuring unit instead of the passive autofocusing system.

Further, although the first embodiment has such a construction that the rotational angular position of the measuring center axis 13 can be detected continuously or unstepwise, the construction of the third embodiment can be modified so that the rotational angular position of the measuring center axis can be detected discontinuously or stepwise by employing a resistance films or contacts having a digital pattern.

Figures 4, 5:
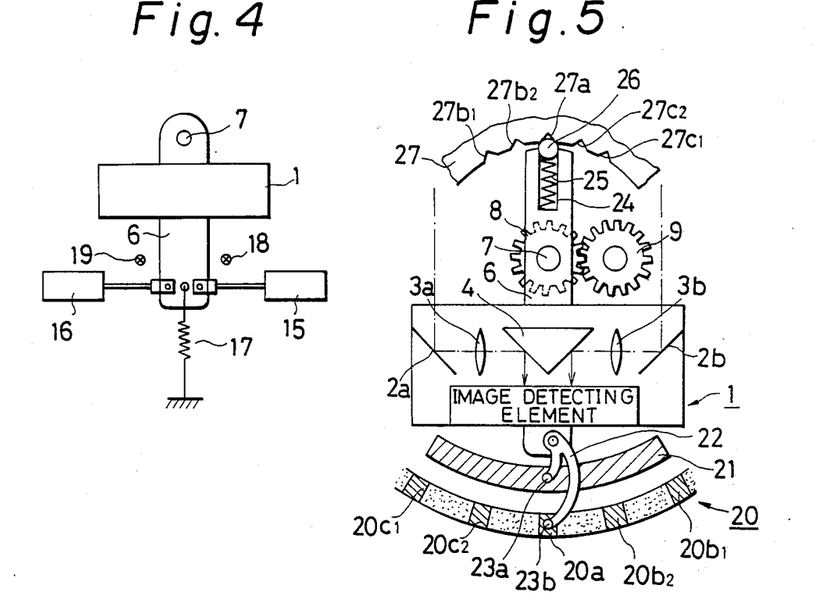
FIG. 4 is a schematic plan view of a distance measuring device according to a second embodiment of the present invention.
FIG. 5 is a schematic plan view of a distance measuring device according to a third embodiment of the present invention applied to a camera having a photographing lens having a changeable two focal points.

Furthermore, although in the first embodiment a rotating machine such as the electric motor is used as the drive means for pivotally moving the measuring center axis 13, a rectilinear driving means such as a plunger may be used as the drive means, as shown in FIG. 4.

FIG. 4 is a schematic plan view of a distance measuring device for an AF camera, according to a second embodiment of the present invention, in which a pair of opposed plungers 15 and 16 are used as the drive means for pivotally moving the measuring center axis 13.

Referring to FIG. 4, the distance measuring device comprises a distance measuring unit 1 and a supporting plate 6 which are substantially the same as those in the first embodiment shown in FIG. 1. Reference of FIGS. 2 and 3 are made to the second embodiment. The supporting plate 6 of the second embodiment is supported at a front end portion thereof to a rotary shaft 7, for pivotal movement about the center axis of the shaft. On the other hand, the supporting plate 6 is operatively connected at a rear end portion thereof to plungers 15 and 16, such as electromagnetic plunger, which are provided to rotate the plate 6 about the center axis of the shaft 7 in opposite directions. Also connected to the rear end portion of the supporting plate 6 is a neutralizing spring 17 which is provided to pull the plate 6 rearwardly so that the measuring center axis 13 of the distance measuring unit 1 is directed to the center point A of the field of view of the finder 14 (FIG. 2) when the plungers 15 and 16 are disenergized. A pair of stoppers 18 and 19 for defining the range of pivotal movement of the supporting plate 6 are stationarily disposed at positions apart from opposite sides of the rear end portion of the supporting plate 6, respectively.

In the distance measuring device of the second embodiment, when it is required to measure a distance to an object which appears at the center point A of the finder 14, the plungers 15 and 16 are each maintained in a disenergized state, and thus the measuring center axis 13 is directed to the front of the AF camera 12. When it is required to measure a distance to an object which appears at the point B of the finder 14, only the plunger 15 is energized to pivotally move the supporting plate 6 to a position at which the plate 6 abuts on the stopper 18. On the other hand, when it is required to measure a distance to an object which appears at the point C of the finder 14, only the plungers 16 is energized to pivotally move the supporting plate 6 to a position at which the plate 6 abuts on the stopper 19.

Although the second embodiment employs the two plungers, a spring may be employed instead of one of the plungers so that the supporting plate can be pushed at one side thereof with a single plunger against the pushing force of the spring.

Figure 6A:
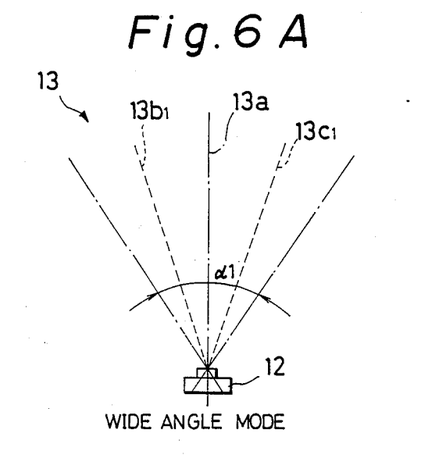
Figure 6B:
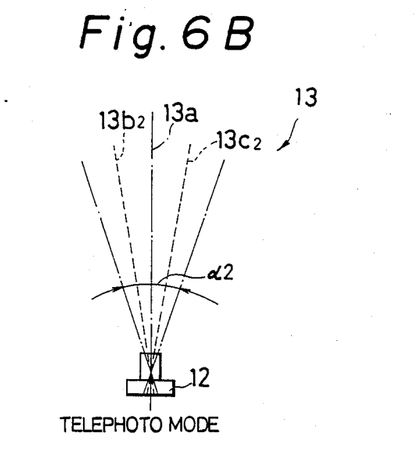
Figure 7:
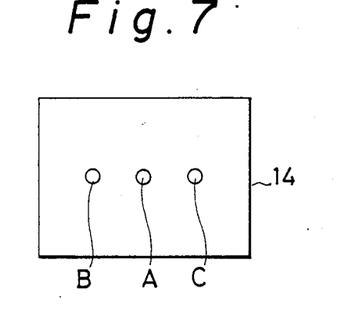
FIG. 7 is a front view schematically illustrating a finder of the camera according to the third embodiment.

FIGS. 5 to 7 are views for explaining a third embodiment of the present invention applied to an AF camera having a photographing lens of a two focal points type.

Referring to FIG. 5, there is schematically shown a distance measuring device which comprises a distance measuring unit 1 having the same construction as that in the first embodiment shown in FIG. 1. The distance measuring unit 1 is supported by an elongated supporting plate 6 which is supported at a position between a front end thereof and the unit 1 to a rotary shaft 7, for pivotal movement about the central axis of the shaft 7. Fixed to the shaft 7 is a gear 8 which intermeshes with a gear 9 driven by a drive means (not shown) for pivotal movement. Disposed behind a rear end portion of the supporting plate 6 are a pair of arc-shaped plates 20 and 21. A resistance layer is disposed on the whole surface of the arc-shaped plate 20, as represented by dots, and a plurality of conductive films $20c_1$, $20c_2$, $20a$, $20b_2$, and $20b_1$ are disposed on the resistance layer and spaced from each other with constant angular intervals. A common conductive film is formed on the whole surface of the arc-shaped plate 21, as represented by oblique lines. Attached to the rear end portion of the supporting plate 6 is a contact support 22 provided with a pair of contacts $23a$ and $23b$ which are fixed to the contact support 22 and are brought into contact with the surfaces of the arc-shaped plate 20 and 21, respectively.

The supporting plate 6 is formed with a hole 24 which extends in a longitudinal direction of the plate 6 and opens on the side of the front end of the plate 6. A compression spring 25 and a ball 26 are inserted into the hole 24, and an arc-shaped ball guide plate 27 having a ball guide surface is disposed in front of the supporting plate 6. The ball 26 in the hole 24 is forced by the spring 25 to abut on the ball guide surface of the ball guide plate 27. A plurality of click grooves $27b_1$, $27b_2$, $27a$, $27c_2$, and $27c_1$ for click engagement with the ball 26 are formed in the ball guide surface of the ball guide plate 27 and spaced from each other with constant angular intervals which correspond to those of the conductive films $20c_1$, $20c_2$, $20a$, $20b_2$, and $20b_1$. When the ball 26 is brought into click engagement with one of the grooves, the contact $23b$ is brought into contact with one of the conductive films, as apparent from FIG. 5.

The AF camera in the third embodiment is schematically shown in FIGS. 6A and 6B and designated by reference numeral 12. A photographing lens of the AF camera 12 is selectively operatable in a wide angle mode and a telephoto mode. When the wide angle mode is selected, the angle of view of the lens is increased as represented by an angle $\alpha_1$ in FIG. 6A. In this state, the measuring center axis 13 of the distance measuring unit 1 is so controlled as to be selectively located at one of three difference angular positions $13a$, $13b_1$, and $13c_1$, as shown in FIG. 6A, by utilizing the conductive films $20a$, $20b_1$, and $20c_1$ and the click grooves $27a$, $27b_1$, and $27c_1$. Namely, when the ball 26 is in engagement with the groove $27a$, the measuring center axis 13 is located at the position $13a$. When the ball 26 is in engagement with the groove $27b_1$, the measuring center axis 13 is located at the position $13b_1$. Further, when the ball 26 is in engagement with the groove $27c_1$, the measuring center axis 13 is located at the position $13c_1$.

On the other hand, when the telephoto mode is selected, the angle of view of the lens is decreased as represented by angle $\alpha_2$ in FIG. 6B. In this embodiment, the size of the angle $\alpha_2$ is approximately half of that of the angle $\alpha_1$. In this state, the measuring center axis 13 of the distance measuring unit 1 is so controlled as to be selectively located at one of three different angular positions $13a$, $13b_2$, and $13c_2$, as shown in FIG. 6B, by utilizing the conductive films $20a$, $20b_2$, and $20c_2$, and the click grooves $27a$, $27b_2$, and $27c_2$. Namely, when the ball 26 is in engagement with the groove $27a$, the measuring center axis 13 is located at the position $13a$. When the ball 26 is in engagement with the groove $27b_2$, the measuring center axis 13 is located at the position $3b_2$. Further, when the ball 26 is in engagement with the groove $27c_2$, the measuring center axis 13 is located at the position $13c_2$.

FIG. 7 schematically shows a finder 14 of the AF camera 12 of the third embodiment. The position $13a$ of the measuring center axis 13 corresponds to a position A of the finder 14, and the positions $13b_1$, and $13b_2$ of the measuring center axis 13 correspond to a position B of the finder 14, while the positions $13c_1$, and $13c_2$ of the measuring center axis 13 correspond to a position C of the finder 14.

The operation of the AF camera 12 of the third embodiment will now be described in detail.

When it is judged, in a controlling system (not shown) which is provided in the camera, that the distance measurement device has to effect distance measurement for each of the three points (referred to as three-point measurement hereinafter), first, the operation mode of the photographing lens is detected. When the wide angle mode is selected, a first distance measurement is effected after the supporting plate 6 is pivotally moved to a position at which the contact 23b comes into contact with the conductive film 20a. Then, a second distance measurement is effected after the supporting plate 6 is pivotally moved to a position at which the contact 23b comes into contact with the conductive film $20b_1$, and then a third distance measurement is effected after the supporting plate 6 is pivotally moved to a position at which the contact 23b comes into contact with the conductive film $20c_1$. In this way, the three-point measurement is completed. Then, resultant data for determining the position of the photographing lens for obtaining an optimum object distance to be focused is calculated from the result of the three-point measurement, and then the photographing lens of the AF camera 12 is moved automatically in accordance with the resultant data.

On the other hand, when the telephoto mode is selected, the three-point measurement is effected when the supporting plate 6 is selectively located at one of three angular positions in which the contact 23b comes into contact with the conductive films 20a, $20b_2$, and $20c_2$, respectively. Then, resultant data for determining the position of the photographing lens for obtaining an optimum object distance to be focused is calculated from the result of the three-point measurement, and then the photographing lens of the AF camera 12 is moved automatically in accordance with the resultant data.

In this way, the three-point measurement can be effected properly in accordance with the mode of photographing operation of the AF camera 12 when either the telephoto mode or the side angle mode is selected.

Although the third embodiment has such a construction as to detect stepwise the position of the supporting plate 6, it is possible to modify the construction of the third embodiment so that the position of the supporting plate 6 can be detected unstepwise for enabling application of the distance measuring device to an AF camera having a zoom lens.

Figure 8:
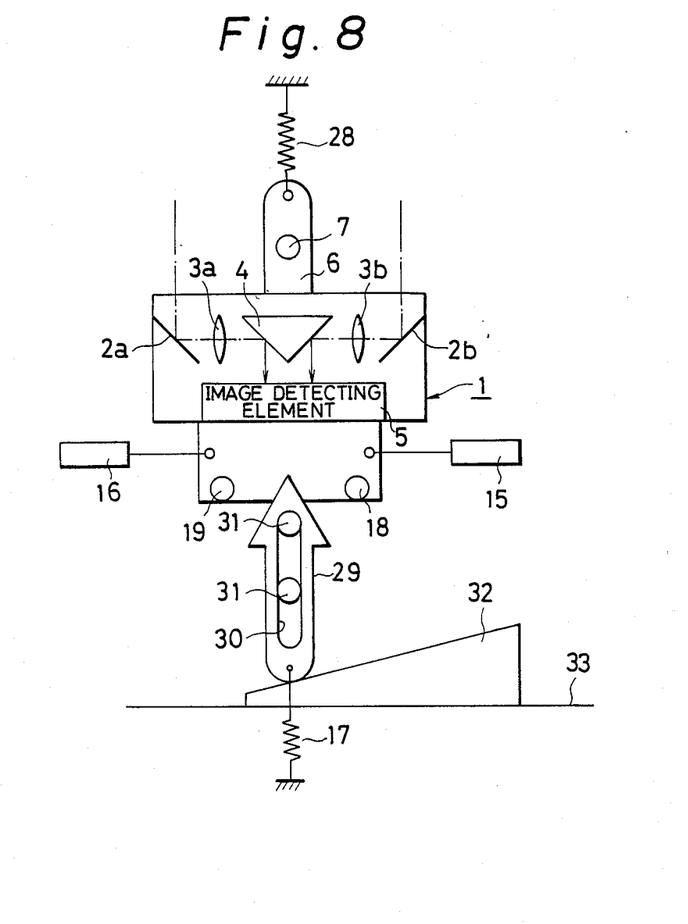
FIG. 8 is a schematic plan view of a distance measuring device according to a fourth embodiment of the present invention applied to a camera with a zoom lens.
Figure 9A:
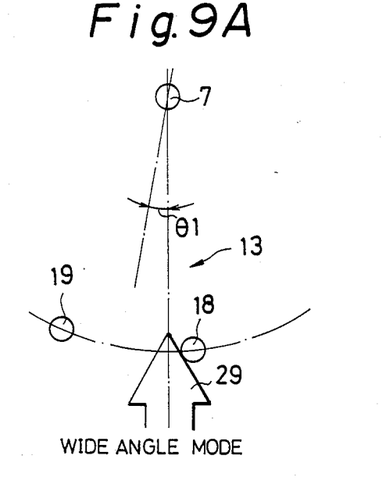
Figure 9B:
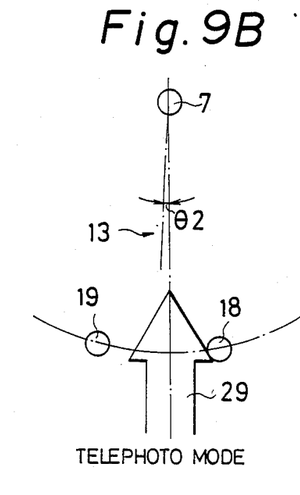

FIGS. 8, 9A, and 9B are views for explaining a fourth embodiment of the present invention applied to an AF camera having a zoom lens. A distance measuring device of the fourth embodiment comprises a distance measuring unit 1 which has the same construction as that of the distance measuring unit 1 of the first embodiment shown in FIG. 1. Referring to FIG. 8, a supporting plate 6 is supported at a position between a front end portion thereof and the distance measuring unit 1 to a rotary shaft 7, for pivotal movement about the center axis of the shaft 7. The supporting plate 6 is formed at a rear end thereof with a laterally enlarged portion disposed behind the unit 1. A pair of plungers 15 and 16 are operatively connected to opposite lateral sides of the enlarged portion of the supporting plate 6. As the enlarged portion of the supporting plate 6 is pulled with one of the plungers 15 and 16, the measuring center axis of the distance measuring unit 1 is pivotally moved about the center axis of the shaft 7 is one of opposite directions. Secured to the opposite lateral sides of the enlarged portion of the supporting plate 6 are a pair of spaced stoppers 18 and 19 projecting from the enlarged portion. Connected to a front end of the supporting plate 6 is a neutralizing spring 28 which is provided to pull the plate 6 forwardly so as to maintain the measuring center axis in a direction substantially parallel to a photographing optical axis of the zoom lens when the plungers 15 and 16 are disenergized.

Reference numeral 29 designates an elongated, rotational-angle limiting plate for limiting the rotational angle of the supporting plate 6. The plate 29 has a front end portion having the shape of an equilateral triangle and is formed with an elongated slot 30 extending in the longitudinal direction of the plate 29. Disposed behind the supporting plate 6 are a pair of stationary pins 31 which are spaced from each other in forward and rearward directions and disposed in the slot 30 of the plate 29. Namely, the plate 29 are restrained by the pins 31 so as to move slidably in the forward and rearward directions. Reference numeral 32 designates a cam which is slidably supported on a stationary slide surface 33 and adapted to move in left and right directions in accordance with changes in a focal distance of the zoom lens. The cam 32 is formed at the opposite side of the sliding surface 33 with an inclined cam surface with which the rear end of the plate 29 is brought into contact by a pulling force of a spring 17.

In the fourth embodiment, due to existence of the front end portion of the rotational-angle limiting plate 29 between the two stoppers 31, the angular range of rotational movement of the supporting plate 6 is limited. As the cam 32 is moved in the left and right directions in accordance with changes in the focal distance of the zoom lens, the rotational-angle limiting plate 29 is moved in the forward and rearward directions. As the plate 29 moves in the forward and rearward directions, the angular range of rotational movement of the supporting plate 6 is varied, because the distances between each of the stoppers 18, 19 and the front end portion of the plate 29 are varied in accordance with the movement of the plate 29 in the forward and rearward directions, due to the triangular shape of the front end portion of the plate 29. More specifically, when the angle of view of the zoom lens is made wider, the cam 32 is moved to a position close to the right side in FIG. 8, and thus the rotational-angle limiting plate 29 is moved rearwardly. In this state, the rotational movements of the stoppers 18 and 19 about the center axis of the shaft 7 are restricted by the triangular portion of the plate 29 at positions near the top end of the plate 29, as shown in FIG. 9A. Accordingly, the maximum range of pivotal movement of the supporting plate 6 about the center axis of the shaft 7 is made wide.

On the other hand, the more the angle of view of the zoom lens is made narrower, the more the rotational-angle limiting plate 29 is moved forwardly, and thus the rotational movements of the stoppers 18 and 19 about the center axis of the shaft 7 are restricted by the triangular portion of the plate 29 at positions distant from the top end of the plate 29, as shown in FIG. 9B. Accordingly, the maximum range of pivotal movement of the supporting plate 6 about the center axis of the shaft 7 is made narrower. Now it is assumed that when the angle of view of the zoom lens is equal to a wider angle $\alpha_1$ (see FIG. 6A), the rotational-angle of the measuring center axis is made equal to an angle $\theta_1$ with the stopper 18 abutted on the front end portion of the plate 29, as shown in FIG. 9A, and that when the angle of view of the zoom lens is equal to a narrower angle $\alpha_2$ (see FIG. 6B), the rotational-angle of the measuring center axis is made equal to an angle $\theta_2$ with the stopper 18 abutted on the front end portion of the plate 29, as shown in FIG. 9B. In this situation, the distance measuring device is so constructed as to satisfy the following equation.

$$\theta_1/\alpha_1 \approx \theta_2/\alpha_2$$

In other words, the maximum range of pivotal movement of the measuring center axis is varied substantially in proportion to the angle of view of the zoom lens.

According to the above-described construction of the fourth embodiment, when a zooming operation of the AF camera is effected by an operator, the cam 32 is slided along the slide surface 33 toward the left in FIG. 8, and thus the rotational-angle limiting plate 29 is moved forwardly in accordance with the sliding movement of the cam. Therefore, the maximum range of effective rotational-angle of the measuring center axis is adjusted automatically in accordance with the zooming operation of the AF camera. If it is judged, in a controlling system (not shown) provided in the AF camera, that the three-point measurement should be effected, then a first distance measurement is effected in the state where the measuring center axis is directed to the center of the visual field of the zoom lens. Then, only one of the plungers, for example, the plunger 16, is activated. As the plunger 16 is activated, the supporting plate 6 and the distance measuring unit 1 together move about the center axis of the shaft 7 in the clockwise direction in FIG. 8, against the force of the neutralizing spring 28, until the stopper 18 abuts on the rotational-angle limiting plate 29. When the supporting plate 6 is stopped at a position at which the stopper 18 abuts on the plate 29, a second distance measurement is effected. Then, the plunger 16 is disactivated, and the plunger 15 is activated. As only the plunger 15 is activated, the supporting plate 6 and the distance measuring unit 1 together move about the center axis of the shaft 7 in the counterclockwise direction in FIG. 8, against the force of the neutralizing spring 28, until the stopper 19 abuts on the rotational-angle limiting plate 29. When the supporting plate 6 is stopped at a position at which the stopper 19 abuts on the plate 29, a third distance measurement is effected. In this way, the three-point measurement is completed. The above-mentioned second and third distance measurements, that is, the measurements of distances to objects which appear in the right and left side portions of the field of view, respectively, are each effected in the state where the measuring center axis is inclined in proportion to the magnitude of the angle of view of the zoom lens.

Although the distance measuring device in the above-mentioned fourth embodiment is adapted to effect the three-point measurement, the present invention is not limited thereto. For example, the distance measurement can be effected for two points or for more than three points, such as four or five points.

Figure 10:
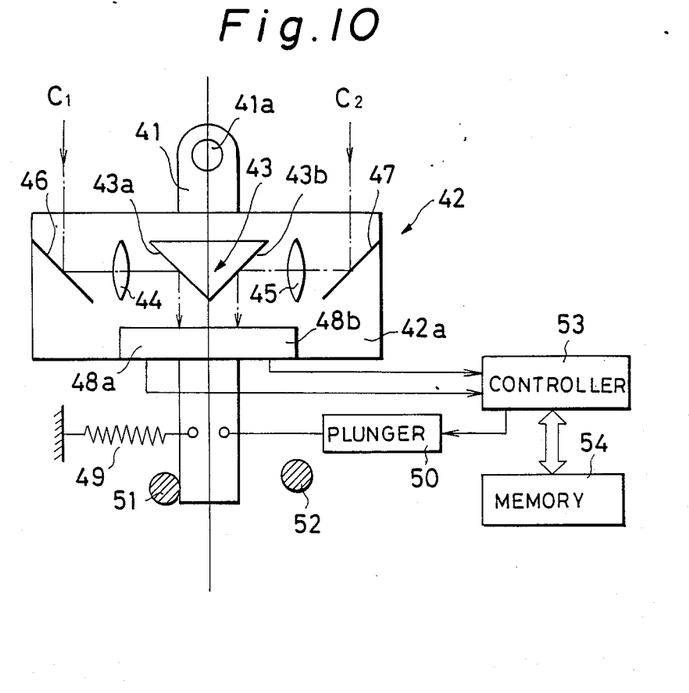
FIG. 10 is a schematic plan view of a distance measuring device according to a fifth embodiment of the present invention.
Figure 11:
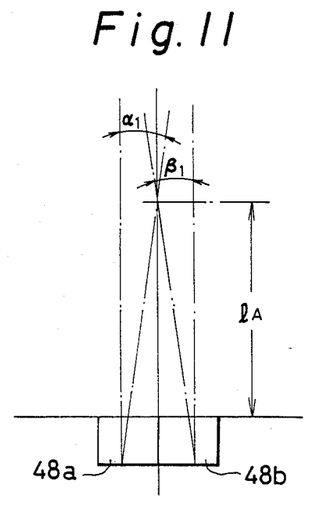
FIG. 11 is a schematic view for explaining the principle of distance measurement according to the fifth embodiment, in which the device is in a normal-distance measuring state.
Figure 12:
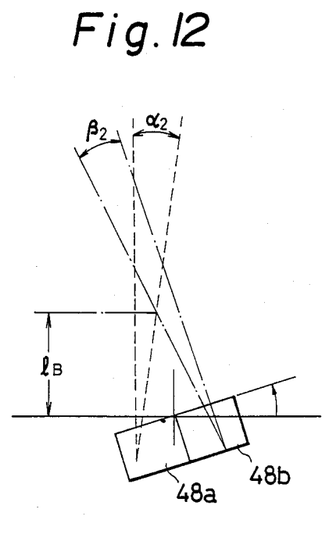
FIG. 12 is a schematic view for explaining the principle of distance measurement according to the fifth embodiment, in which the device is in a short-distance measuring state.

FIG. 10 is a schematic plan view of a distance measuring device for an AF camera, according to a fifth embodiment of the present invention. In this embodiment, the AF camera has a photographing lens which is selectively operatable in a normal-distance photographing mode for photographing an object located at position within a range from a middle distance to infinity, and a short-distance photographing mode such as a macro mode. FIG. 11 is a schematic view for explaining the principle of distance measurement, according to the fifth embodiment, with the device being in a normal-distance measuring state which corresponds to the normal-distance photographing mode of the photographing lens. FIG. 12 is a schematic view for explaining the principle of distance measurement, according to the fifth embodiment, with the device in a state of measuring a short-distance measuring state which corresponds to the short-distance photographing mode of the photographing lens.

In FIG. 10, the distance measuring device comprises a supporting plate 41, which is rotatably mounted on a stationary portion of a camera body through a shaft 41a fixed to a front end of the supporting plate 41. A distance measuring unit 42 having a frame portion 42a is secured to the supporting plate 41. Mounted on the frame portion 42a at a position on a center axis of the supporting plate 41 is a mirror 43 having a pair of opposed reflecting surfaces 43a and 43b which together form a V-shaped configuration in which the reflecting surfaces make an angle of 90 deg. A pair of lenses 44 and 45 are mounted on the frame portion 42a at positions apart from the mirror 43 in opposite directions perpendicular to the center axis of the supporting plate 41. Also mounted fixedly on the frame portion 42a are a pair of mirrors 46 and 47 for making incoming lights from the mirror surfaces so that the incoming lights change their directions at angle of 90 deg toward the lenses 44 and 45, respectively. Behind the reflecting surfaces 43a and 43b there is disposed a pair of image detecting elements 48a and 48b which are mounted on the frame portion 42a at respective imaging positions of the lights reflected from the mirrors 44 and 45. Each of the image detecting elements 48a and 48b is adapted to produce image data.

The reflecting surface 43a of the mirror 43, the lense 44, the mirror 46, and the image detecting element 48a together constitute a first distance measuring optical system of the distance measuring unit 42, while the reflecting surface 43b of the mirror 43, the lense 45, the mirror 47, and the image detecting element 48b together constitute a second distance measuring optical system of the distance measuring unit 42.

Connected to the supporting plate 41 at a position close to a rear or free end thereof is a coil spring 49 for forcing the supporting plate 41 in a clockwise direction about the center axis of the shaft 41a. Also there is connected to the free end portion of the supporting plate 41 a plunger 50 which is adapted to cause the plate 41 to move pivotally about the center axis of the shaft 41a in a counterclockwise direction against the force of the coil spring 49 when the plunger 50 is energized. The spring 49 and the plunger 50 are disposed at opposite sides of the longitudinal axis of the support plate 41. Stationarily disposed at positions apart from the opposite sides of the free end of the support plate 41, respectively, are a pair of stationary positioning pins 51 and 52, one of which is disposed for limiting the rotational movement of the supporting plate 41 during the normal-distance measuring state, while the other of which is disposed for limiting the rotational movement of the supporting plate 41 during the short-distance measuring state.

A controller 53 is provided for making a calculation of distance to an object on the basis of the respective image detection data output from the image detecting elements 48a and 48b and for causing the plunger 50 to be energized during the short-distance measuring state. A memory 54 is also provided for storing the respective image detection data output from the image detecting elements 48a and 48b.

In the above-mentioned construction of the fifth embodiment, light reflected from an object is received into the AF camera body along a line $C_1$ with respect to the distance measuring unit 42, as shown in FIG. 10, then reflected by the mirror 46 through the lens 44 to the mirror surface 43a, and then reaches the image detecting element 48a. Light reflected from an object is also received into the AF camera body along a line $C_2$ with respect to the distance measuring unit 42, as shown in FIG. 10, then reflected by the mirror 47 through the lens 45 to the mirror surface 43b, and then reaches the image detecting element 48b. The lenses 44 and 45 are adjusted in position so that the object is imaged on each of the image detecting elements 48a and 48b.

Next, the operation of the distance measuring device of the fifth embodiment during the normal-distance and short-distance measuring states is described below in detail with reference to FIGS. 11 and 12.

When the distance measuring device is in the normal-distance measuring state (from a middle distance to infinity), with the plunger 50 maintained in a disenergized state, and the coil spring 49 thus causes the supporting plate 41 to be abutted on the positioning pin 51. In this state, two light-receiving regions, from which the image detecting elements 48a and 48b can receive light, have angles $\alpha_1$ and $\beta_1$, respectively, as shown in FIG. 11, and thus a minimum measurable distance to an object has a length $l_A$. Two images formed through the respective distance-measuring optical systems are detected by the image detecting elements 48a and 48b, respectively, when the supporting plate 41 is abutted on the positioning pin 51.

When it is judged, in the controller 53, that the distance measuring device can not detect a phase-discrepancy between the two images formed on the image detecting elements 48a and 48b, and thus the short-distance measuring state has to be selected, image data output from one of the image detecting elements 48a and 48b, such as the element 48a, which is in the state shown in FIG. 11, is stored in the memory 54.

Then, the plunger 50 is energized to cause the supporting plate 41 to move toward the positioning pin 52. The supporting plate 41 is then maintained at a position at which it abuts on the positioning pin 52. Namely, the distance measuring device is changed to the short-distance measuring state. In this state, image data output from the other image detecting element 48b, which is in the state shown in FIG. 12, is stored in the memory 54. Then, a distance to an object is calculated from these two image data stored in the memory 54. Accordingly, in the short-distance measuring state, it is assumed that the two light-receiving regions, from which the image detecting elements 48a and 48b receive light, have angles $\alpha_1$ and $\beta_2$, respectively, as shown in FIG. 12, and thus a minimum measurable distance has a length $l_B$ which is shorter than the length $l_A$.

As described above, in the normal-distance measuring state, only a distance having a length which is greater than the length $l_A$ (FIG. 11) can be measured. However, since, in the short-distance measuring state, two data which are obtained before and after the light receiving direction of the distance measuring unit 41 is changed, respectively, are compared, the minimum measurable distance can be reduced to the length $l_B$ (FIG. 12). Accordingly, when the distance measuring device of the fifth embodiment is applied to the AF camera, a measurable minimum object distance can be reduced while preventing reduction of accuracy of distance measurement.

Although in the above-mentioned fifth embodiment, the plunger 50 is used as a drive means for pivotally moving the supporting plate 41, the supporting plate 41 may be linked with a mode switching mechanism of the photographing lens for switching the mode of operation thereof between the normal-distance photographing mode and the short-distance photographing mode, so as to be moved in accordance with the switching operation of the mode switching mechanism.

While the invention has been described in conjunction with specific embodiments thereof, it is evident that many alternatives, modifications, and variations will be apparent to those skilled in the art in light of the foregoing description. Accordingly, it is intended to include all such alternatives, modifications and variations as to fall within the spirit and scope of the appended claims.

What is claimed is:

1. A distance measuring device of a triangulation system type for an automatic focusing camera having a photographing optical system, comprising:
   a distance measuring unit for measuring a distance to an object to be focused through said photographing optical system, said unit being comprised of a pair of image detecting elements each for detecting an image of the object, and a pair of distance-measuring optical systems each for imaging the object onto one of said image detecting elements;
   a drive means for pivotally moving said distance-measuring optical systems and said image detecting elements of said unit integrally in a plane parallel to an optical axis of said distance-measuring optical systems without causing any relative movement of said distance-measuring optical systems and said image detecting elements with respect to each other; and
   a control means for controlling said drive means such as to stop pivotal movement of said unit at each of at least two or more different pivotal angular positions thereof to thereby enable measurement of distance to each of at least two or more different points appearing in a field of view of said camera.

2. A distance measuring device according to claim 1, wherein said control means is adapted to adjust maximum angular range of pivotal movement of said distance measuring unit in accordance with changes in a focal distance of said photographing optical system.

3. A distance measuring device according to claim 1, wherein said control means comprises a position detecting means which detects continuously the pivotal angular position of said distance measuring unit and outputs a signal for controlling said drive means.

4. A distance measuring device according to claim 1, wherein said control means comprises a position detecting means which detects stepwise the pivotal angular position of said distance measuring unit and outputs a signal for controlling said drive means.

5. A distance measuring device according to claim 1, wherein said control means comprises a stopping means for mechanically stopping the pivotal movement of said unit at each of at least two or more different pivotal angular positions thereof.

6. A distance measuring device according to claim 1, wherein said drive means comprises a drive motor for pivotally moving said distance measuring unit about a pivot axis thereof, said drive motor being operatively connected to said distance measuring unit through a rotation transmitting means.

7. A distance measuring device according to claim 1, wherein said drive means comprises at least one plunger which can be energized to cause said distance measuring unit to move pivotally in one direction about a pivot axis thereof.

8. A distance measuring device according to claim 1 further comprising a processing means for calculating a distance to an object to be focused through said photographing optical system, which is in the state of a short-distance photographing mode, by comparing the two image data, one of which is obtained from one of said distance-measuring optical systems when said photographing optical system is in a normal-distance photographing mode, while the other of which is obtained from the other distance-measuring optical system when said photographing optical system is in said short-distance photographing mode.

9. A distance measuring device of a triangulation system type for an automatic-focusing camera having a photographing optical system which is selectively operatable in a normal-distance photographing mode for photographing an object, which is located at a position relatively far from the camera, and in a short-distance photographing mode for photographing an object which is located at a position close to the camera, said distance measuring device comprising:

a pair of image detecting elements each of which detects an image of an object to be focused through said photographing optical system to output image data;

a pair of distance-measuring optical systems each for imaging the object onto one of said image detecting elements, said distance-measuring optical systems being spaced a predetermined reference length from each other;

an actuating means for pivotally moving said distance-measuring optical systems and said image detecting elements integrally in a plane parallel to each of optical axes of distance-measuring optical systems in accordance with changes in the mode of operation of said photographing optical system, so that the angular position of each of said optical axes of the distance-measuring optical systems during said short-distance photographing mode and the angular position of the same during said normal-distance measuring mode are different from each other; and a processing means for calculating a distance to an object to be focused through said photographing optical system, which is in said short-distance measuring mode, by comparing two image data, one of which is obtained from one of said image detecting elements when said photographing optical system is in said normal-distance measuring mode, while the other of which is obtained from the other image detecting element when said photographing optical system is in said short-distance measuring mode.

10. A distance measuring device according to claim 9, wherein said actuating means comprises a stopping means for mechanically stopping the pivotal movement of said distance-measuring optical systems and said image detecting elements together at each of at least two or more different pivotal angular positions thereof.

* * * * *